United States Patent [19]
Lawson

[11] 3,874,683
[45] Apr. 1, 1975

[54] SNOWMOBILE TRAILER
[76] Inventor: Clarence E. Lawson, 343 Quadra Ave., Rio Linda, Calif. 95673
[22] Filed: Sept. 12, 1972
[21] Appl. No.: 288,398

[52] U.S. Cl.................. 280/10, 214/506, 280/400
[51] Int. Cl........................................... B62b 13/18
[58] Field of Search................ 280/9, 10; 296/28 M

[56] References Cited
UNITED STATES PATENTS

| | | | |
|---|---|---|---|
| 565,310 | 8/1896 | Weber | 280/10 |
| 1,128,698 | 2/1915 | Levy | 280/10 |
| 1,958,312 | 5/1934 | Potts et al. | 280/9 |
| 2,628,733 | 2/1953 | Hale | 214/506 |
| 3,721,467 | 3/1973 | Kerr | 296/28 M |
| 3,730,542 | 5/1973 | Chadwick | 280/9 |

FOREIGN PATENTS OR APPLICATIONS
497,390   12/1938   United Kingdom............. 280/475

Primary Examiner—Leo Friaglia
Attorney, Agent, or Firm—Blair & Brown

[57] ABSTRACT

A trailer mounted on wheels for carrying a snowmobile from place to place and then convertible to runners for serving as a snowmobile trailer to be pulled in the snow by the snowmobile. The trailer is provided with a tilt body and tail gate to permit the snowmobile to be run directly into and out of the trailer. The convertible runners swing on longitudinal pivots to a position overlying the wheels where they serve as fenders to a position supporting the wheels where they serve as runners.

2 Claims, 9 Drawing Figures

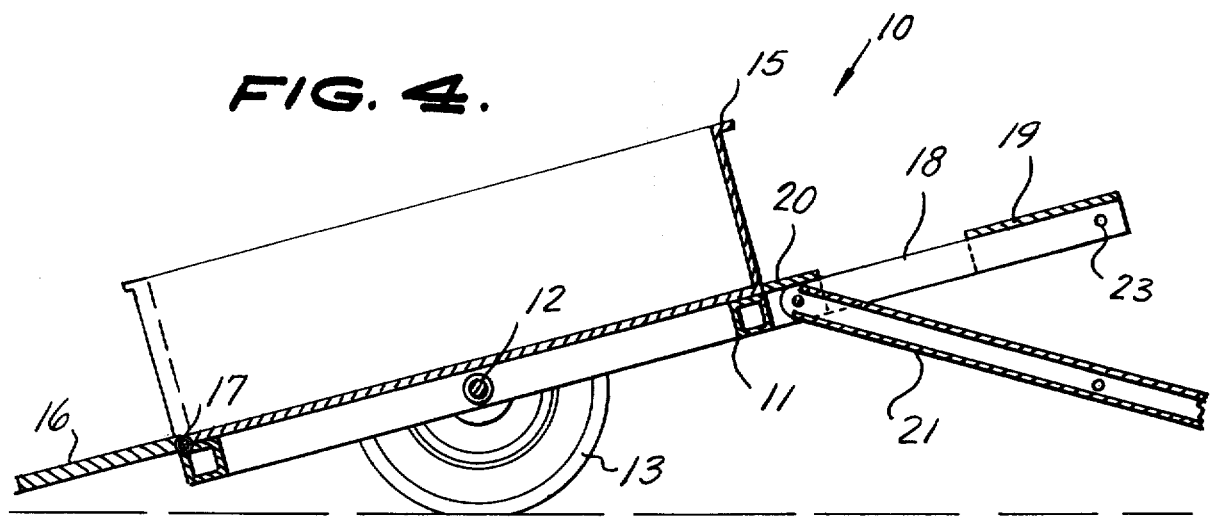
FIG. 4.
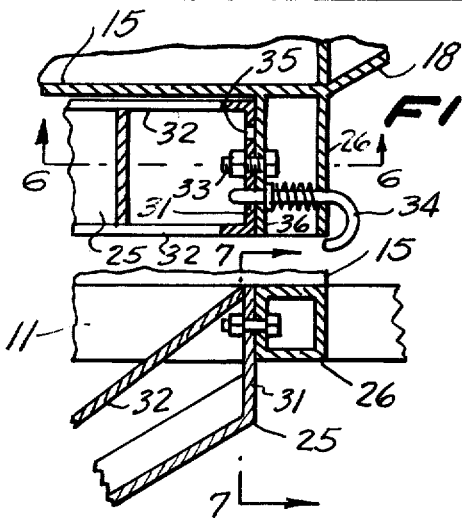
FIG. 5.
FIG. 7.
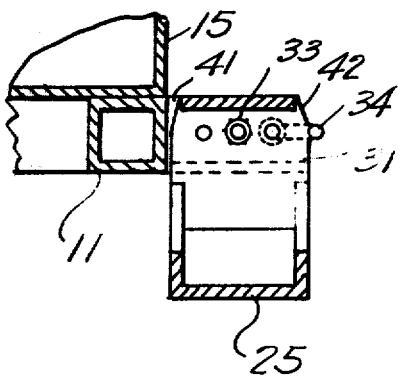
FIG. 6.
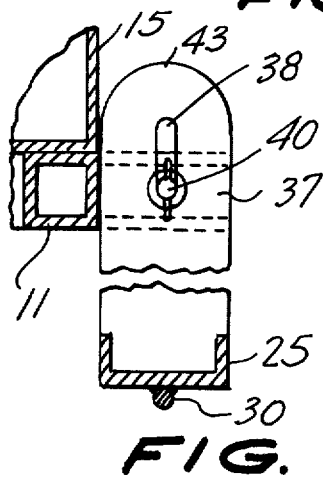
FIG. 8.
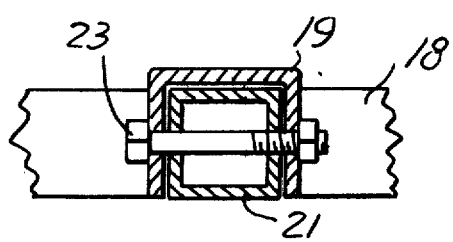
FIG. 9.

SNOWMOBILE TRAILER

BACKGROUND OF THE INVENTION

Field of the Invention

The present invention relates to trailers which can be used on snow or hard surfaces to follow either a snowmobile or a wheeled vehicle.

SUMMARY OF THE INVENTION

The snowmobile trailer has a tilt body for ease of loading the snowmobile therein and has runners which serve as fenders over the wheels or snow runners under the wheels in their two positions of use.

The primary object of the invention is to provide a snowmobile trailer which can be used on hard surfaces or snow by converting from wheels to runners.

Other objects and advantages will become apparent in the following specification when considered in the light of the attached drawings.

BRIEF DESCRIPTION OF THE DRAWINGS

FIG. 4 is a vertical sectional view of the trailer in loading position, taken along the line 4—4 of FIG. 1, looking in the direction of the arrows;

FIG. 5 is a transverse horizontal sectional view, taken along the line 5—5 of FIG. 2, looking in the direction of the arrows;

FIG. 6 is a fragmentary vertical sectional view, taken along the line 6—6 of FIG. 5, looking in the direction of the arrows;

FIG. 7 is a transverse sectional view, taken along the line 7—7 of FIG. 6, looking in the direction of the arrows;

FIG. 8 is a transverse fragmentary sectional view, taken along the line 8—8 of FIG. 2, looking in the direction of the arrows; and FIG. 9 is a transverse sectional view, taken along the line 9—9 of FIG. 2, looking in the direction of the arrows.

DESCRIPTION OF THE PREFERRED EMBODIMENT

Figure 1:
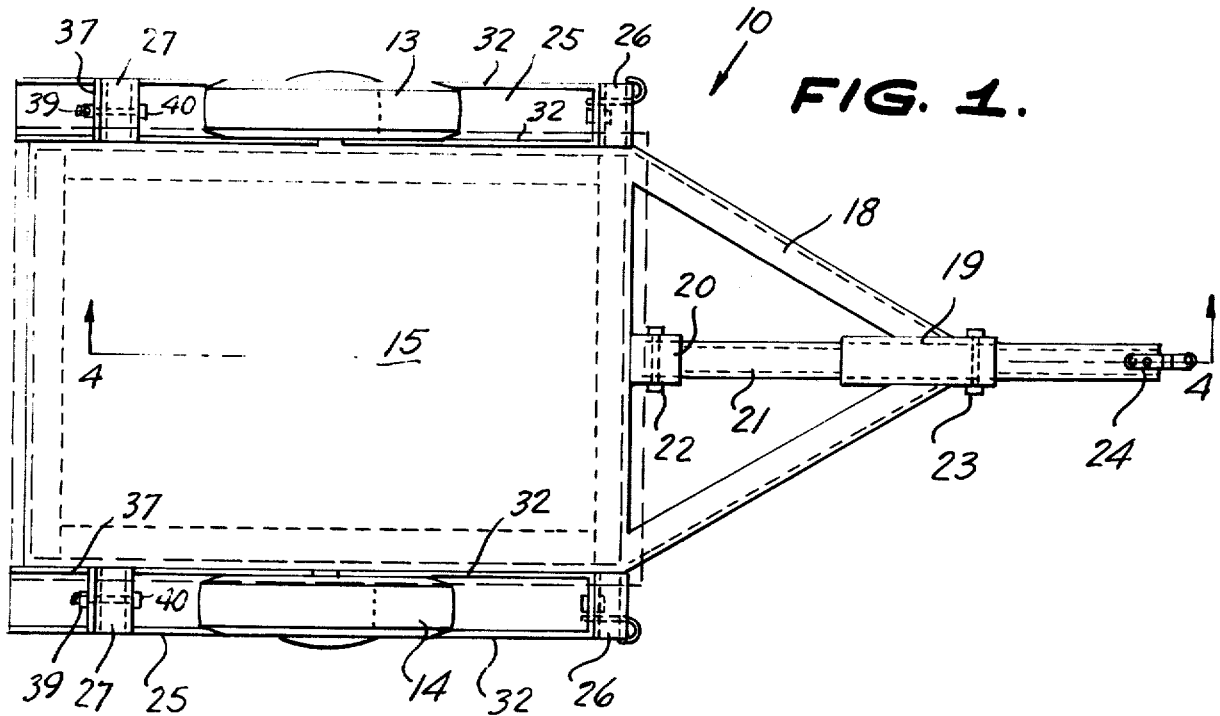
FIG. 1 is a top plan view of the invention.

Referring now to the drawings in detail, wherein like reference characters indicate like parts throughout the several figures, the reference numeral 10 indicates generally a snowmobile trailer constructed in accordance with the invention.

The snowmobile trailer 10 includes a frame 11 supported on a transverse axle 12 having a pair of wheels 13, 14 journalled on the opposite ends thereof. An open top trailer body 15 is secured to the frame 11 and has a tail gate 16 secured thereto with a horizontal hinge 17.

A V-shaped draft gear 18 extends forwardly from the frame 11 and includes an inverted channel member 19 secured to the forward end thereof. A channel shaped bracket 20 is mounted on the frame 11 in aligned relation to the inverted channel member 19. An elongate tongue 21 is secured in the bracket 20 by a transverse pivot bolt 22 and is adapted to be releaseably secured in the channel member 19 by a transverse bolt 23. A hitch 24 is secured to the forward end of the tongue 21 for securing the trailer 10 to a towing vehicle.

A trailer 10 is adapted to tilt as illustrated in FIG. 4 so as to permit a vehicle to be driven into and out of the trailer body 15 across the tail gate 16 with the trailer 15 still connected to the towing vehicle. The pin 23 is replaced so as to secure the tongue 21 in the channel member 19 and to lock the trailer 10 in its level position.

A channel shaped combined fender and sled runner 25 is positioned on each side of the trailer 10 between a pair of sub-frame members 26, 27 which project in parallel relation laterally of the frame 11. The channel shaped runner 25 has a generally horizontal portion 28 and a sloping portion 29 which extends at an angle thereto. A rod or guide rail 30 is welded centrally of the channel member 25 completely along the horizontal portion 28 and along a portion of the sloping portion 29.

An upright plate element 31 is secured to the forward end of the combined fender and runner 25 and has a pair of braces 32 secured thereto and extending toward the horizontal portion 28 to which they are secured as braces. The plate 31 is pivotally secured to the sub-frame member 26 by a longitudinally extending pivot bolt 33. A spring pressed latch pin 34 extends through the sub-frame member 26 and is adapted to engage in a selected one of the pair of bores 35, 36 to lock the combined fender and runner in its fender position and in its runner position.

A plate member 37 is secured to the runner end of the horizontal portion 28 and extends upwardly therefrom in parallel relation to the plate 31. The plate 37 is substantially longer than the plate 31 and has a slot 38 formed therein to receive a wing nut 39 and bolt 40 extending through the sub-frame member 27.

The plate 31 has a rounded corner 41 to permit it to pivot about the bolt 33 and the opposite corner is rounded at 42. The upper end of the plate 37 is rounded at 43 to permit it to be pivoted about the bolt 40.

Figure 2:
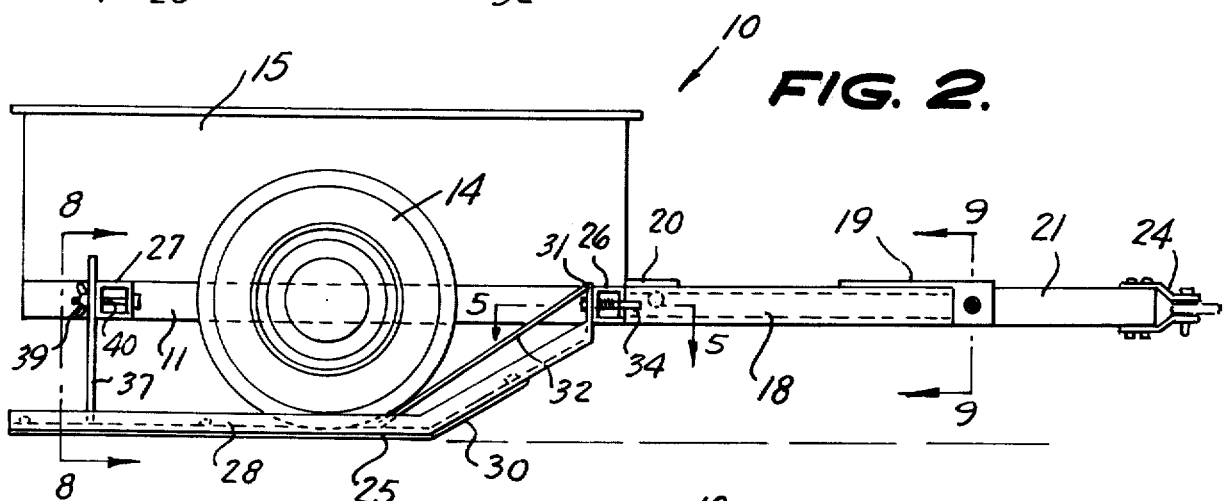
FIG. 2 is a side elevation of the invention showing the runners in wheel supporting position.
Figure 3:
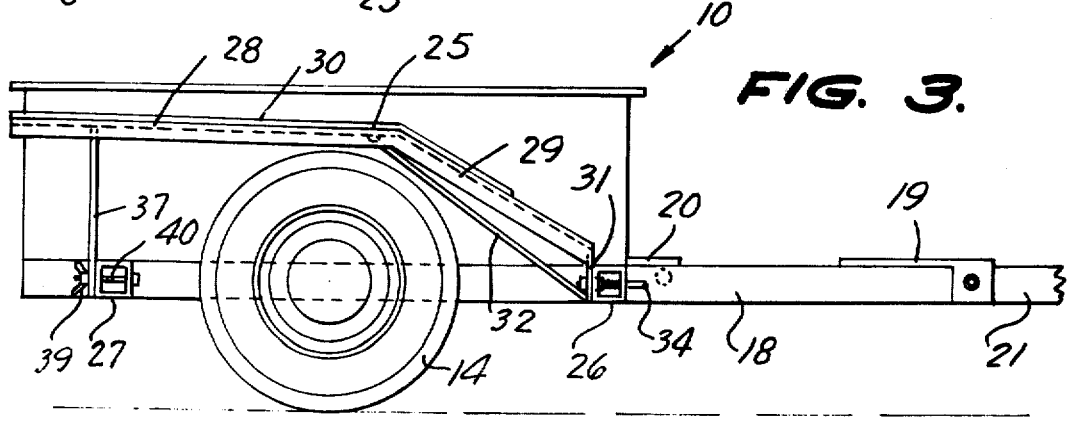
FIG. 3 is a view similar to FIG. 2 with the runners in elevated position.

In the use and operation of the invention the trailer 10 is first coupled to an automobile and the snowmobile is loaded therein for travel to the point of use over hard clear roads. Upon arriving at the snow fields where the snowmobile is to be used the snowmobile is unloaded as described above and the trailer pin disconnected from the automobile and connected to the snowmobile. At this point the wing nut 39 is loosened and the latch pin 34 is withdrawn to permit the combined fender and runner 25 to be swung from its fender position as illustrated in FIG. 3 to its runner position as illustrated in FIG. 2. When moving the member 25 to its runner position, each wheel can be lifted to permit the member to be swung into its operative position under the wheel. The wing nut is again tightened on the bolt 40 and the latch pin 34 is released to engage in the bore 36 to lock the combined fender and runner 25 in its runner position.

When the snowmobile run is complete the procedure is reversed and the snowmobile is again loaded onto the trailer 10 to return to the starting point over hard road.

Having thus described the preferred embodiment of the invention it should be understood that numerous structural modifications and adaptations may be resorted to without departing from the spirit of the invention.

What is claimed is:

1. In a snowmobile trailer, a frame, an axle extending transversely of said frame and secured thereto, for supporting said, a trailer body secured to said frame, a pair of wheels journalled on opposite ends of said axle, sub-frame members arranged in parallel relation laterally of the frame, a pair of combined channel shaped fender and runners positioned on each side of the trailer between said sub-frame members, said channel shaped members each including a generally horizontal portion and a sloping portion that is arranged angularly with respect to said horizontal portion, an upright plate element secured to the front end of the fender and runners, braces secured to said plate element and to the horizontal portion, said plate element being pivotally connected to an adjacent sub-frame member by means of a pivot bolt, a spring pressed latch pin extending through the last named sub-frame member for selectively engaging one of a plurality of bores, a plate member secured to the horizontal portion of the combined fender and runner and said plate member being arranged in spaced parallel relation to said plate element, said plate member having a slot therein, and a securing element extending through said slot and through an adjacent sub-frame member.

2. The structure as defined in claim 1 and further including a guide rail secured to said combined fender and runner completely along the horizontal portion and along a portion of the sloping section thereof.

* * * * *